United States Patent
Yu et al.

(10) Patent No.: US 7,308,033 B2
(45) Date of Patent: Dec. 11, 2007

(54) APPARATUS AND METHOD FOR TRACKING RESIDUAL FREQUENCY OFFSET FOR SINGLE CARRIER-FREQUENCY DOMAIN EQUALIZER SYSTEM

(75) Inventors: Hee-Jung Yu, Daejeon (KR); Jae-Young Ahn, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 751 days.

(21) Appl. No.: 10/407,785

(22) Filed: Apr. 3, 2003

(65) Prior Publication Data

US 2004/0076239 A1    Apr. 22, 2004

(30) Foreign Application Priority Data

Oct. 22, 2002  (KR) ............... 10-2002-0064510

(51) Int. Cl.
*H04K 1/10* (2006.01)
*H04L 27/28* (2006.01)
(52) U.S. Cl. ............... 375/260; 375/340; 375/346
(58) Field of Classification Search ............. 375/260
See application file for complete search history.

(56) References Cited

U.S. PATENT DOCUMENTS

| 2002/0086707 | A1* | 7/2002 | Struhsaker et al. ......... 455/561 |
| 2002/0111158 | A1* | 8/2002 | Tee ............................ 455/421 |
| 2003/0039218 | A1* | 2/2003 | Kwak ......................... 370/320 |
| 2003/0039219 | A1* | 2/2003 | Kwak ......................... 370/320 |
| 2003/0039220 | A1* | 2/2003 | Kwak ......................... 370/320 |
| 2003/0039226 | A1* | 2/2003 | Kwak ......................... 370/329 |
| 2003/0039227 | A1* | 2/2003 | Kwak ......................... 370/330 |
| 2003/0169824 | A1* | 9/2003 | Chayat ....................... 375/260 |
| 2004/0066773 | A1* | 4/2004 | Sun et al. ................... 370/343 |
| 2004/0208253 | A1* | 10/2004 | Joo ............................ 375/260 |

FOREIGN PATENT DOCUMENTS

KR    2000-0074901    12/2000

OTHER PUBLICATIONS

"Training Sequence versus Cyclic Prefix—A new Look on Single Carrier Communication," IEEE Comm. Letters, vol. 5, No. 7, Jul. 2001.*
2000 IEEE, "OFDM synchronisation based on the phase rotation of sub-carriers", D. Matic, et al., 5 pages.

(Continued)

*Primary Examiner*—David C. Payne
*Assistant Examiner*—Nader Bolourchi
(74) *Attorney, Agent, or Firm*—Blakely, Sokoloff, Taylor & Zafman

(57) ABSTRACT

A method for tracking a residual frequency offset for a single carrier-frequency domain equalizer system includes: determining a pilot from the data and known pilot data, adding the determined pilot to the leading part of the data, copying a part of the frame of the data after a block and adding it before the block, and generating a preamble to construct one frame; eliminating a cyclic prefix, processing signals per an FFT block, extracting the preamble, and performing an initial channel estimation; updating a channel estimation, performing channel compensation, receiving a pilot, calculating an average phase of all the pilots in one FFT block, updating the channel estimation, performing an IFFT operation, extracting data, and recovering the original digital signal from the data.

10 Claims, 4 Drawing Sheets

OTHER PUBLICATIONS

"Optimum Receiver Design For Wireless Broad-Band Systems Using OFDM-Part 1", M. Speth, et al., 1999 IEEE, 10 pages.

Heejung Yu et al., "Frequency Offset Tracking Scheme for SC-FDE with Frequency Domain Pilot", The 12th Joint Conference on Communications and Information, Apr. 24-26, 2002, JCCI 2002, VII-B.2.1 - 4.

Heejung Yu et al., "Frequency Offset Tracking Scheme for SC-FDE Systems" (5 pp), WWireless LAN Research Team, Broadband Wireless Communications Dept., ETRI Daejeon, Korea, Jun. 18, 2002.

* cited by examiner

APPARATUS AND METHOD FOR TRACKING RESIDUAL FREQUENCY OFFSET FOR SINGLE CARRIER-FREQUENCY DOMAIN EQUALIZER SYSTEM

BACKGROUND OF THE INVENTION (a) Field of the Invention

The present invention relates to an apparatus and method for compensating for a residual frequency offset after an initial synchronization process of frequency synchronization that plays an important role in a mobile communication system.

(b) Description of the Related Art

In general, data recovery is impossible to realize with a frequency offset in a SC-FDE (Single Carrier-Frequency Domain Equalizer) system as in all communication systems, so frequency synchronization is a significant factor in system performance.

Accordingly, a carrier-frequency offset leads to a deterioration of the system performance in the SC-FDE system.

In the conventional SC-FDE system, a known symbol (e.g., pilot) or data in the time domain are generally used for compensation of the frequency offset, as in a general single carrier system.

Even after estimation and compensation of the initial frequency offset, the system performance may deteriorate due to the residual frequency offset.

It is therefore required to track the residual frequency offset and compensate for the tracked residual frequency offset after estimation and compensation of the initial frequency offset so as to minimize the performance deterioration.

SUMMARY OF THE INVENTION

It is an object of the present invention to solve the problems with the prior art and to provide an apparatus and method for compensating for a residual frequency offset by adding a frequency domain pilot to the residual frequency offset, and tracking the residual frequency offset using the added frequency domain pilot.

It is another object of the present invention to provide an apparatus and method for calculating a time domain symbol value necessary for insertion of a specific pilot in the frequency domain using data of one block.

It is further another object of the present invention to provide an apparatus and method for tracking and updating a frequency offset in consideration of the effect of the frequency offset on the frequency domain.

In one aspect of the present invention, there is provided a method for tracking a residual frequency offset that includes: (a) upon receiving a digital signal, determining a pilot from the values of data and known pilot data to be added, and adding the determined pilot to the leading part of the data; (b) performing a cyclic prefix for copying a part of the frame portion of the data after a block in the units of the block having a fast Fourier transform (FFT) size and adding it before the block, generating a preamble to construct one frame structure, providing a channel effect to the generated transmission frame, and sending the transmission frame; (c) eliminating a cyclic prefix (CP), processing signals received in the units of the block, extracting the preamble, and performing an initial channel estimation; (d) updating a channel estimate with a determined compensation constant and an average phase of pilots, and performing channel compensation using the updated channel estimate; and (e) receiving a pilot portion output after the channel compensation, calculating an average phase of all the pilots in one FFT block, updating the channel estimate, performing an inverse fast Fourier transform (IFFT) operation using the data and the pilot, extracting the data, and recovering the original digital signal from the extracted data.

In another aspect of the present invention, there is provided an apparatus for tracking a residual frequency offset for a single carrier-frequency domain equalizer system, the apparatus including: a signal mapper for mapping data to be transmitted according to a modulation method upon receiving a digital signal; a pilot calculator for determining a pilot from the values of the data determined by the signal mapper and known pilot data to be added; a pilot adder for adding the pilot determined by the pilot calculator to the leading part of the data; a cyclic prefix adder for copying a part of the frame portion of the data after a block in the units of the block having an FFT size, and adding it before the block; a preamble generator for performing initial signal detection, automatic gain control, synchronization, and channel estimation; a frame composer for constructing one frame structure using the preamble interval and the data interval; and a multipath fading channel applier for providing a channel effect to the generated transmission frame.

In further another aspect of the present invention, there is provided an apparatus for tracking a residual frequency offset for a single carrier-frequency domain equalizer system, the apparatus including: a cyclic prefix remover for removing a cyclic prefix; an FFT section for processing signals received in units of an FFT block, and extracting a preamble; a channel estimator for performing an initial channel estimation using the preamble; an updating constant calculator for calculating an updating constant adequate for a current channel status or the amount of the residual frequency offset; a channel estimate updater for updating the channel estimate from the channel estimator according to the determined updating constant and the average phase of pilots; a frequency domain channel equalizer for performing channel compensation using the channel estimation received from the channel estimate updater; a pilot extractor for extracting a pilot portion from the data and the pilot output from the frequency domain channel equalizer, and outputting the extracted pilot portion; an average pilot phase calculator for receiving the pilot portion, calculating an average phase of all the pilots in one FFT block, and sending the average phase of pilots to the channel estimate updater; an IFFT section for performing an IFFT operation using the data and the pilot; a data extractor for extracting the data and outputting the extracted data; and a signal determiner for recovering the original digital signal from the output signal of the data extractor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
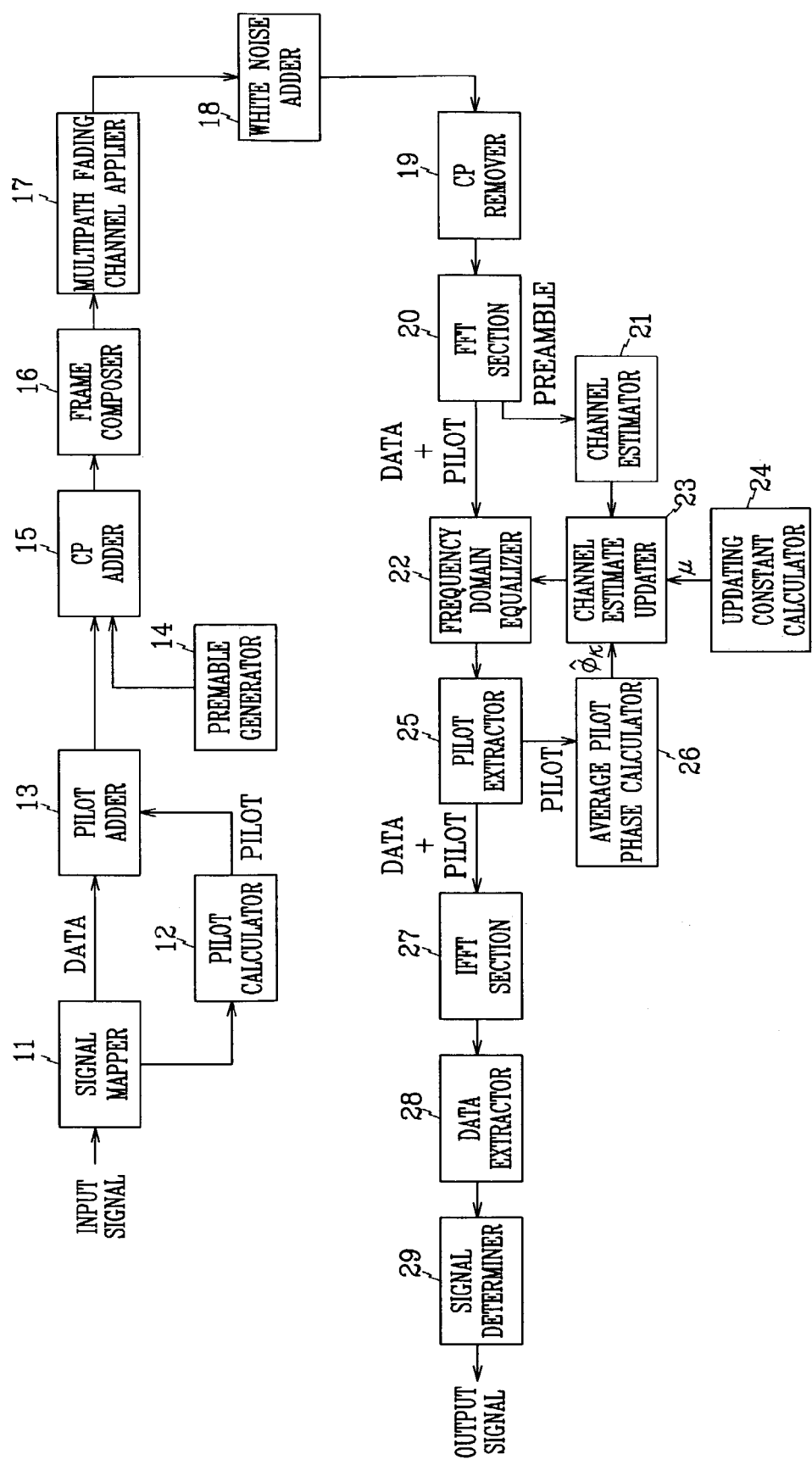
FIG. 1 is a schematic of a residual frequency offset tracking apparatus for an SC-FDE system according to an embodiment of the present invention.

FIG. 1 is a schematic of a residual frequency offset tracking apparatus of an SC-FDE system according to an embodiment of the present invention.

The residual frequency offset tracking apparatus of an SC-FDE system according to the embodiment of the present invention comprises, as shown in FIG. 1, a signal mapper 11, a pilot calculator 12, a pilot adder 13, a preamble generator 14, a CP (Cyclic Prefix) adder 15, a frame composer 16, a multipath fading channel applier 17, a white noise adder 18, a CP remover 19, an FFT (Fast Fourier Transform) section 20, a channel estimator 21, a frequency domain equalizer 22, a channel estimate updater 23, an updating constant calculator 24, a pilot extractor 25, an average pilot phase calculator 26, an IFFT (Inverse Fast Fourier Transform) section 27, a data extractor 28, and a signal determiner 29.

Figure 3:
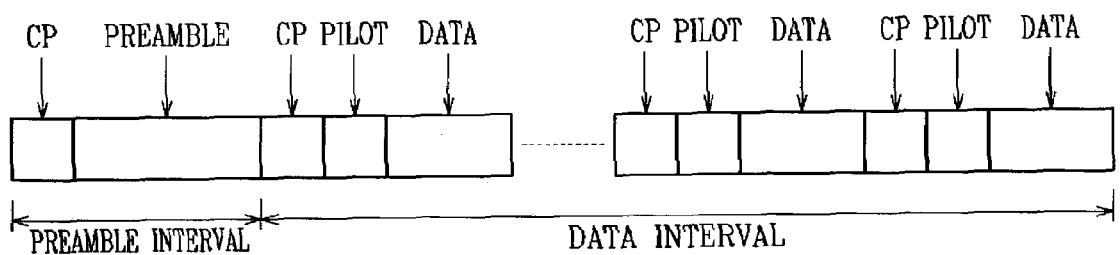
FIG. 3 shows a frame structure applied in the SC-FDE system.

At the transmitter, the signal mapper 11 maps transmit data according to a modulation method, upon receiving a digital signal. The pilot calculator 12 calculates a pilot from the values of the data determined by the signal mapper 11 and known pilot data to be added. The pilot adder 13 adds the determined pilot to the leading part of the data. The CP adder 15 copies a part of the frame portion of the data after a block in the units of the block having an FFT size, and adds it before the block. Referring to FIG. 3, although the pilot is positioned before the frame in the embodiment of the present invention, the position of the pilot can be readily changed through a modification of the mathematical formulas. The preamble generator 14 performs initial signal detection, automatic gain control, synchronization, and channel estimation. The frame composer 16 constructs one frame structure using the generated preamble interval and the data interval. The multipath fading channel applier 17 provides a channel effect to the generated transmission frame. The white noise adder 18 adds white noise to the signal.

At the receiver, the CP remover 19 removes a CP. The FFT section 20 receives signals in the units of the FFT block. The channel estimator 21 performs initial channel estimation using the preamble. The updating constant calculator 24 determines an updating constant adequate for the current channel status or the amount of the residual frequency offset. The channel estimate updater 23 updates the channel estimate of the channel estimator 21 according to the determined updating constant and the average phase of pilots. The frequency domain channel equalizer 22 performs channel compensation using the channel estimate received from the channel estimate updater 23. The pilot extractor 25 extracts a pilot portion from the data and the pilot. The average pilot phase calculator 26 receives the pilot portion, calculates the average phase of all the pilots in one FFT block, and sends the average phase of pilots to the channel estimate updater 23. The IFFT section 27 performs an IFFT operation using the data and the pilot. The data extractor 28 extracts the data solely. The signal determiner 29 restores the input signal by the reverse process of the signal mapper 11.

Now, a description will be given in detail as to an operation of the above-constructed residual frequency offset tracking apparatus of the SC-FDE system according to the embodiment of the present invention.

First, SC-FDE is one transmission system for overcoming the limitations of a time domain equalizer in broadband wireless transmission, and it has the same basic concept as OFDM (Orthogonal Frequency Division Multiplexing).

The equalizer is applied in the frequency domain using FFT and IFFT. No more than one tap equalizer can be used in realization of the system, because the frequency non-selective fading channel is constructed by the respective sub-carriers. The CP is used to absorb all the multipath components. The difference between OFDM and SC-FDE lies in whether the IFFT section lies in the transmitter or the receiver.

In SC-FDE, the pilot is inserted in a different manner from OFDM or the existing single carrier system, because the transmit signal is transferred in the time domain but equalization is acquired in the frequency domain. Namely, to estimate the frequency offset in the frequency domain, the pilot in the time domain is determined from the symbol values in one FFT interval. Thus, for FFT of the data symbol in the time domain and the data symbol, the pilot having a predetermined value is disposed at a desired position in the frequency domain.

For example, let the size of FFT be 32, the desired number of pilots be 4, and the positions of the pilots defined as FIG. 3.

Figure 2:
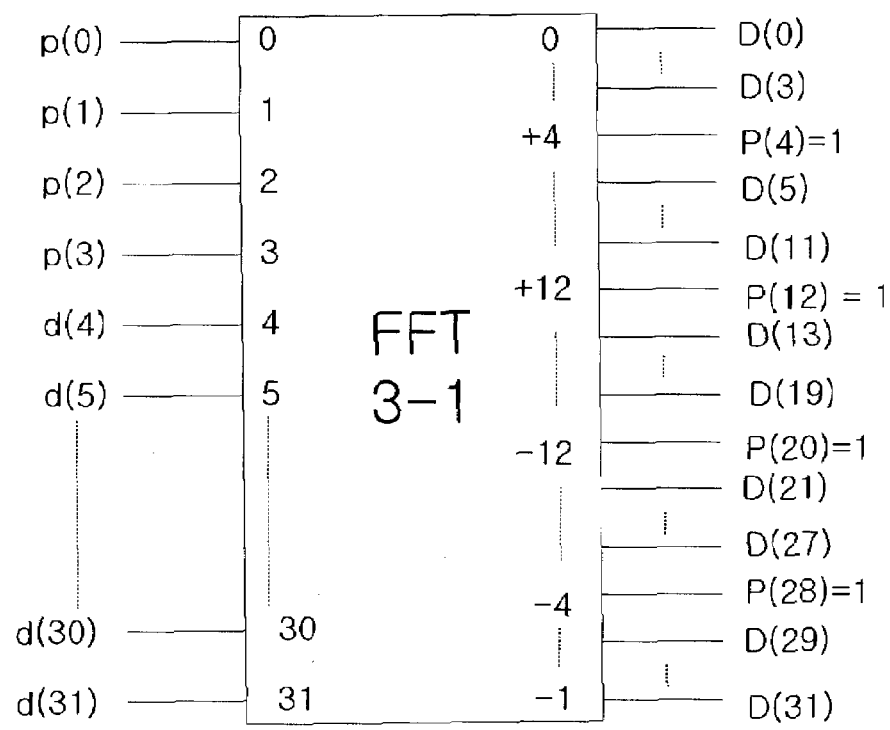
FIG. 2 shows an arrangement of a frequency domain pilot.

In FIG. 2, p(n) and d(n) represent a pilot symbol and a data symbol in the time domain, respectively; and P(n) and D(n) at the FFT output terminal represent a pilot symbol and a data symbol in the frequency domain, respectively. p(n) (for $0 \leq n \leq 3$) is determined from d(n) (for $4 \leq n \leq 31$) and P(n)=F(n)=1 (for n $\epsilon\{4, 12, 20, 28\}$). This relationship can be expressed by a matrix:

$$W \begin{bmatrix} p \\ d \end{bmatrix} = F, F(i) = 1, i \in \{4, 12, 20, 28\} \quad \text{[Equation 1]}$$

where p and d are defined as follows:

$$p=[p(0)\Lambda p(3)]^T \quad \text{[Equation 2]}$$

$$d=[d(4)\Lambda d(31)]^T \quad \text{[Equation 3]}$$

In Equation 1, W is an FFT matrix, where the element of the i-th row and the j-th column is defined as $w^{i,j}=\exp[-j2(i-1)(j-1)/32]$. Equation 1 can be rewritten as:

$$\begin{bmatrix} p \\ 0_{28} \end{bmatrix} = \begin{bmatrix} W^{-1}_{(0\sim 3)} \\ W^{-1}_{(4\sim 31)} \end{bmatrix} F - \begin{bmatrix} 0_4 \\ d \end{bmatrix} \quad \text{[Equation 4]}$$

where $0_n$ represents a null vector having a length of n; and $W^{-1}_{(0 \sim 3)}$ and $W^{-1}_{(4 \sim 31)}$ represent a matrix of zero to third rows and a matrix of fourth to thirty-first rows, respectively.

Equation 4 can be divided into two determinants as follows:

$$AF = d, \text{ where } A = W^{-1}_{(4 \sim 31)} \quad \text{[Equation 5]}$$

$$p = W^{-1}_{(0 \sim 3)} F \quad \text{[Equation 6]}$$

In determination of F, F(n) (for n $\in \{4, 12, 20, 28\}$) are known, as stated above, and the rest of F(n) are given by:

$$A_{data} F_{data} = d - A_{pilot} F_{pilot} \quad \text{[Equation 7]}$$

where the subscripts "data" and "pilot" of A and F represent the matrix and the vector constructed using a column or element corresponding to the data and the pilot frequency, respectively. Accordingly, the embodiment of the present invention is defined as follows:

$$F_{pilot} = [F(4) \, F(12) \, F(20) \, F(28)]^T \quad \text{[Equation 8]}$$

$$F_{data} = [F(0) \Lambda F(3) \, F(5) \Lambda F(11) \, F(13) \Lambda F(19) \, F(21) \Lambda F(27) \, F(29) \Lambda F(31)]^T \quad \text{[Equation 9]}$$

$$A_{pilot} = [A^4 \, A^{12} \, A^{20} \, A^{28}] \quad \text{[Equation 10]}$$

$$A_{data} = [A^0 \Lambda A^3 \, A^5 \Lambda A^{11} \, A^{12} \Lambda A^{19} \, A^{21} \Lambda A^{27} \, A^{29} \Lambda A^{31}] \quad \text{[Equation 11]}$$

By using $F_{data}$ and $F_{pilot}$, the time domain pilot "p" can be determined according to Equation 6.

Now, a description will be given in detail as to a method for tracking a frequency offset using the inserted frequency domain pilot.

For tracking a phase change caused by a frequency offset in SC-FDE, the effect of the frequency offset in the frequency domain is taken into consideration. Let x(n) be the transmit signal and $\epsilon$ be the frequency offset normalized at frequency intervals of FFT. Then, the received signal is given by:

$$r(n) = x_h(n) e^{j 2\pi n \frac{\epsilon}{N}} + \eta(n), \, x_h(n) = \sum_{k=0}^{L-1} x(n-k) h(k) \quad \text{[Equation 12]}$$

where h(k) and $\eta$(n) represent a channel impulse response and white noise, respectively.

The FFT output of the received signal, i.e., the signal in the frequency domain is defined as:

$$R(k) = \frac{1}{\sqrt{N}} \sum_{n=0}^{N-1} r(n) e^{-j 2\pi \frac{nk}{N}} = \\ X(k) H(k) \frac{\sin \pi \epsilon}{N \sin(\pi \epsilon / N)} e^{j \pi \epsilon (N-1)/N} + I(k) + W(k) \quad \text{[Equation 13]}$$

where X(k) and H(k) represent the FFT outputs of x(n) and h(n), i.e., frequency responses, respectively; and I(k) and W(k) represent inter-carrier interference (ICI) and white noise, respectively. ICI is almost negligible when $\eta$ is small.

It can be seen from Equation 13 that the same phase and size changes occur in one FFT block due to the effect of the frequency offset. For PSK (Phase Shift Keying) signals, the deterioration of performance caused by the frequency offset can be considerably avoided simply by phase compensation.

The same phase transition occurs by the respective frequencies due to the effect of the frequency offset. So, the present invention suggests a method for tracking a frequency offset by estimation and compensation of the transient phase using pilots. The transient phase resulting from the frequency offset can be estimated by calculating an average frequency phase of the pilots as follows.

$$\hat{\Phi}_k = \text{avg}(\arg(R_k(i) \cdot P_k(i)^*)), \, i \in \{\text{frequencies at which pilot is present}\} \quad \text{[Equation 14]}$$

where $\Phi_k$ represents a phase transition corresponding to the k-th FFT block; and $R_k(i)$ and $P_k(i)$ represent the output symbol of the frequency domain equalizer and a pilot symbol, respectively.

For compensation of the estimated phase, a method of updating the channel estimate is applied as follows.

$$\arg(H_k(i)) = \arg(H_{k-1}(i)) + \mu \cdot \hat{\Phi}_k$$

$$\text{mag}(H_k(i)) = \text{mag}((H_{k-1}(i))) \quad \text{[Equation 15]}$$

Here, the updating constant $\mu$ is determined in consideration of the channel status, such as signal-to-noise ratio (SNR), or the amount of the residual frequency offset. At a high SNR, for example, the effect of noise is not so significant and the phase tracking ability can be enhanced with the updating constant $\mu$ set at a high level. But, at a low SNR, the effect of noise is so significant and the effect of estimation errors must be minimized with the updating constant $\mu$ set at a low level. With a large amount of the residual frequency offset, the updating constant $\mu$ is set at a high level so as to rapidly converge the frequency offset to zero. Contrarily, with a small amount of the residual frequency offset, the updating constant $\mu$ is set at a low level to reduce the variation of the offset in the converged state.

Now, the embodiment of the present invention will be described in detail as follows.

Referring to FIG. 1, upon receiving an input digital signal, the signal mapper 11 at the transmitter maps data to be transmitted, i.e., binary source according to the modulation method, normally using an M-ary QAM (Quadrature Amplitude Modulation) method.

Then, the pilot calculator 12 determines the pilot according to Equations 6 and 7, as described above, using the values of the data determined by the signal mapper 11 and known pilot data to be added.

The pilot adder 13 adds the determined pilot to the leading part of the data, as illustrated in FIG. 3. The CP adder 15 copies a part of the frame portion of the data after a block in the units of the block having an FFT size, and adds it before the block.

Referring to FIG. 3, although the pilot is positioned before the frame in the embodiment of the present invention, the position of the pilot can be readily changed through a modification of the mathematical formulas.

The preamble generator 14 performs initial signal detection, automatic gain control, synchronization, and channel estimation.

The frame composer 16 constructs one frame structure using the generated preamble interval and the data interval, as shown in FIG. 3. This process constitutes the transmission process of the transmitter.

The transmission frame is subjected to the channel effect at the multipath fading channel applier 17 and combined with the white noise at the white noise adder 18 into a distortion signal, which is then fed into the receiver.

The received signal is first removed of the CP at the CP remover 19 and fed into the FFT section 20 in the units of the FFT block. The FFT section 20 applies a preamble to the channel estimator 21 for initial channel estimation through FFT and then applies data and pilots to the frequency domain channel equalizer 22 in the rest of the data interval.

The channel estimator 21 performs initial channel estimation using the preamble. The updating constant calculator 24 determines an updating constant adequate for the current channel status or the amount of the residual frequency offset.

The channel estimate updater 23 updates the channel estimate of the channel estimator 21 according to the determined updating constant and the average phase of pilots.

The frequency domain channel equalizer 22 performs channel compensation using the channel estimate received from the channel estimate updater 23.

Because the FFT section 20 appearing right after the preamble has no channel estimation value, the frequency domain channel equalizer 22 performs channel equalization using the initial channel estimate received from the channel estimator 21. From the second FFT block, the frequency domain channel equalizer 22 performs channel equalization using the compensated value given by Equation 15.

From the equalized data and pilot, the pilot extractor 25 extracts the pilot portion and sends the extracted pilot portion to the average pilot phase calculator 26 and sends the FFT block including data and pilots to the IFFT section 27.

The average pilot phase calculator 26 calculates an average phase of all the pilots in one FFT block and sends the average to the channel estimate updater 23. The updating constant calculator 24 determines an updating constant adequate for the current channel status or the amount of the residual frequency offset and sends it to the channel estimate updater 23. The channel estimate updater 23 updates the channel estimation according to Equation 15 using the average phase of pilots and the updating constant.

The updated value is used as a channel estimate in equalizing the next FFT block.

The IFFT section 27 performs an IFFT operation using the data and the pilot. The data extractor 28 extracts the data and sends the extracted data to the signal determiner 29, which then restores the input signal by the reverse process of the signal mapper 11.

The result of a simulation for determining whether to operate the frequency offset tracking method is presented as follows.

Figure 4:
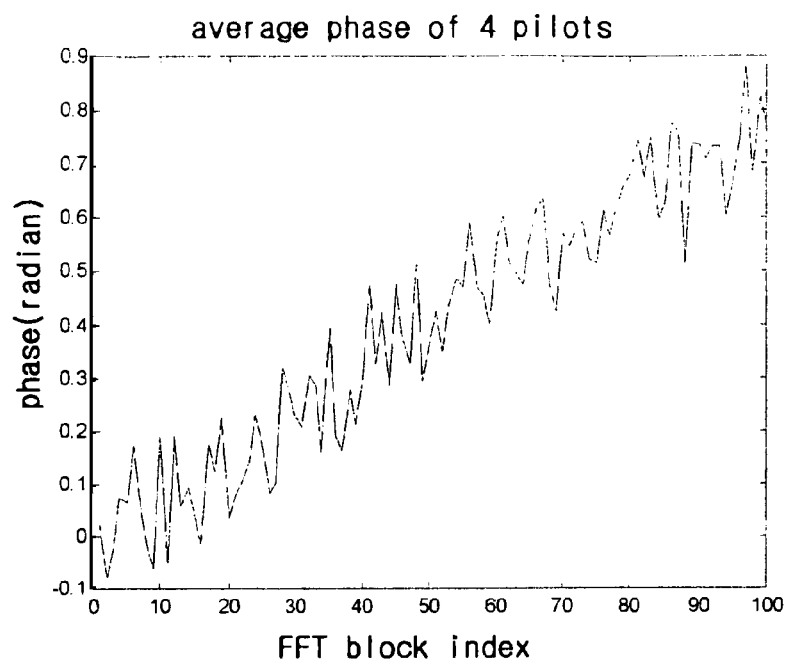
FIG. 4 shows a phase change of the frequency domain pilot of the SC-FDE system caused by a frequency offset.
Figure 5:
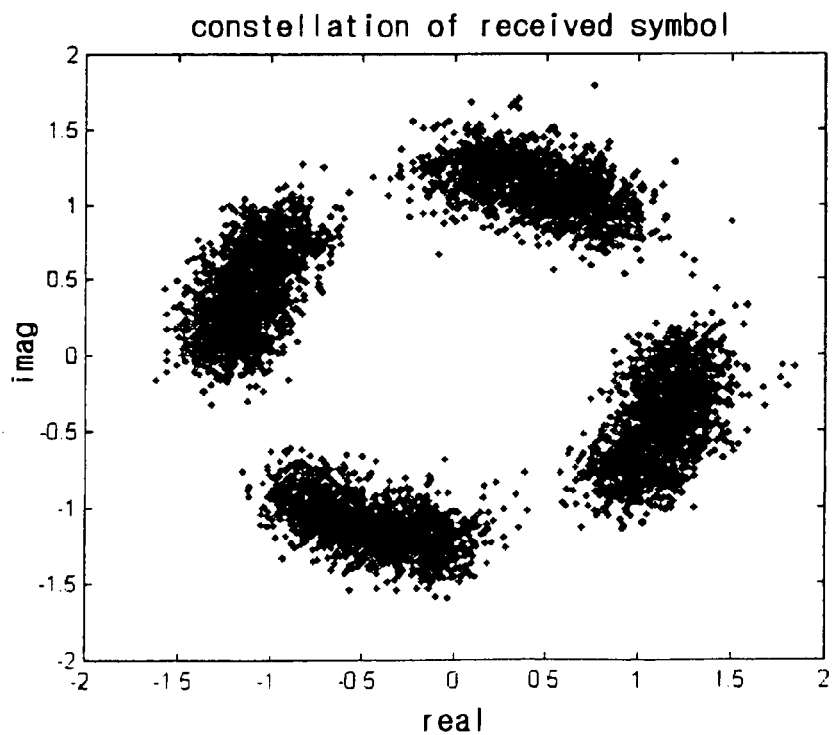
FIG. 5 shows a distorted constellation diagram of time domain data of the SC-FDE system caused by the frequency offset.

FIGS. 4 and 5 present data constellation showing the effect of the frequency offset, i.e., the phase change of a pilot and the data after an equalizer according to prior art.

Figure 6:
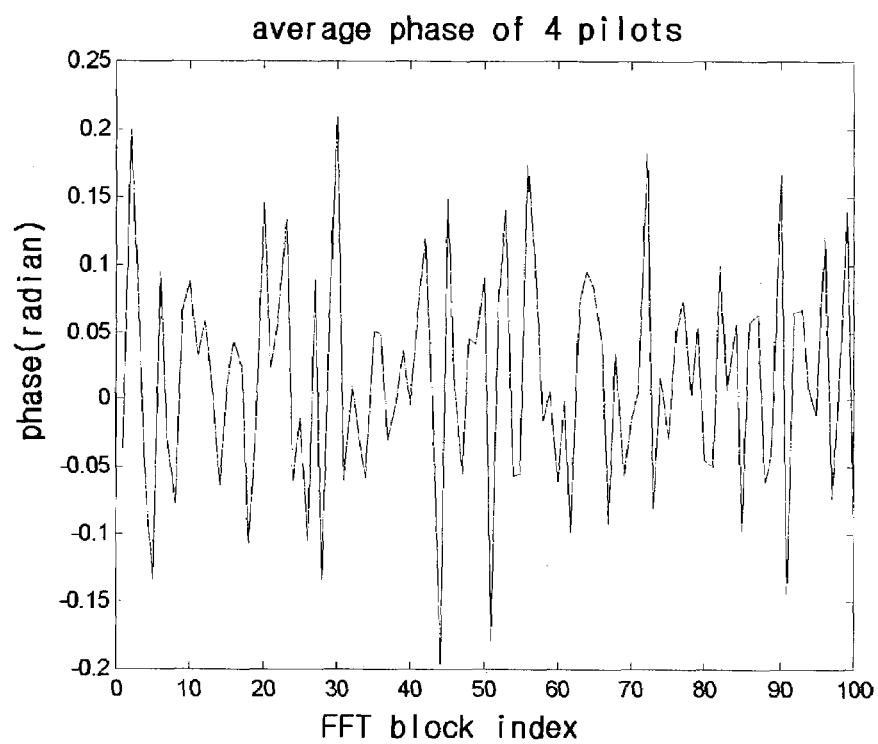
FIG. 6 shows a phase change of the frequency domain pilot compensated by the frequency offset tracking apparatus.

The use of the suggested compensation method is illustrated in FIG. 6.

Referring to FIG. 6, the phase of the pilot does not exceed a predetermined value due to the tracking of the frequency offset.

Figure 7:
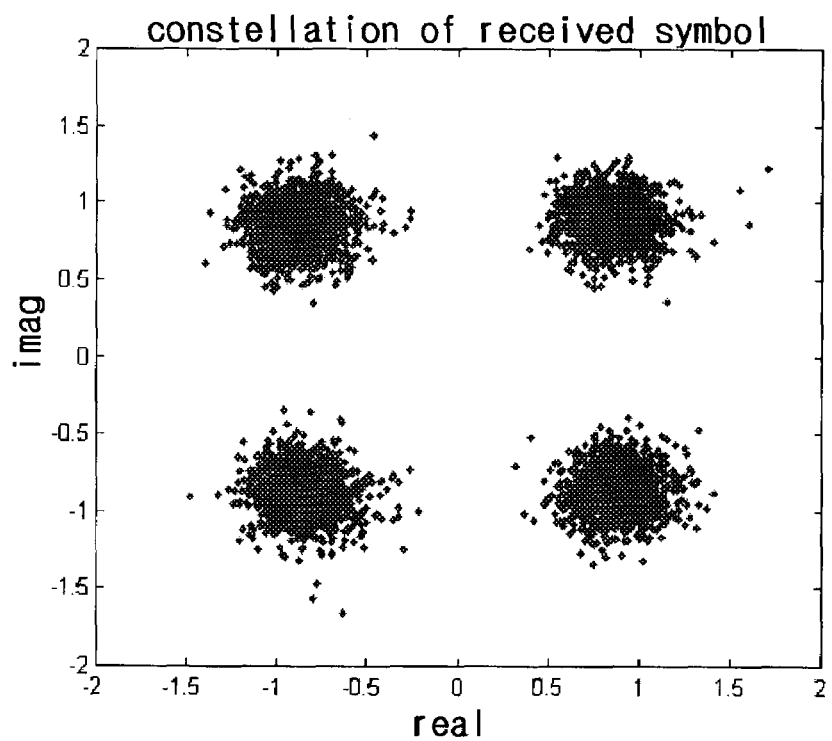
FIG. 7 is a constellation diagram of the time domain data compensated by the frequency offset tracking apparatus.

In FIG. 7, the data constellation of the output of the equalizer is correctly distinguishable.

The frame structure used in the simulation is the structure of FIG. 3, in which the number or the position of preambles and the insertion position of the pilot can be varied as occasion demands.

The simulation is carried out in a quasi-static multipath fading channel environment with the frequency offset normalized in the sampling frequency being 0.0001 and the energy-to-noise ratio per bit $E_0/N_0$ of 15 dB. The data modulation is QPSK (Quaternary Phase Shift Keying) and the frame format is presented in FIG. 3.

Contrary to the frequency synchronization method of the conventional SC-FDE system, the present invention uses a frequency domain pilot and tracks the frequency offset during the frequency domain equalization, thereby readily acquiring synchronous tracking relative to the conventional method.

Although frequency synchronization is mentioned in the present invention, the tracking of timing synchronization is also enabled for the frequency domain pilot. In the timing synchronization, calculations for pilot insertion are additionally required in the transmitter but the synchronization is readily acquired at the receiver.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, unlike the frequency synchronization method of the conventional SC-FDE system, an apparatus and method for tracking a residual frequency offset according to the embodiment of the present invention uses a frequency domain pilot and tracks the frequency offset during the frequency domain equalization, thereby readily achieving synchronous tracking relative to the conventional method.

What is claimed is:

1. A method for tracking a residual frequency offset, comprising:
   (a) upon receiving a digital signal, determining a pilot from the values of data and known pilot data to be added, and adding the determined pilot to the leading part of the data;
   (b) performing a cyclic prefix for copying a part of a frame portion of the data after a first block in a unit of blocks having a fast Fourier transform (FFT) size and adding said part before the first block, generating a preamble to construct the blocks into one frame structure, adding a channel effect to the generated transmission frame, and sending the transmission frame: (c) eliminating a cyclic prefix (CP), processing signals received in the units of the FFT block, extracting the preamble, and performing an initial channel estimation; (d) updating the channel estimation according to a determined updating constant and an average phase of pilots, and performing channel compensation using the updated channel estimation; and (e) receiving a pilot portion output after the channel compensation, calculating an average phase of all the pilots in one FFT block, updating the channel estimation performing an inverse fast Fourier transform (IFFT) operation using the data and the pilot after channel estimation, extracting the data, and recovering the signal from the extracted data.

2. The method as claimed in claim 1, wherein (a) comprises:
   mapping the data to be transmitted according to a modulation method upon receiving a digital signal;
   determining the pilot from the values of the data specified by the mapping step and known pilot data to be added; and
   adding the determined pilot to the leading part of the data.

3. The method as claimed in claim 1, wherein (b) comprises:
   copying the part of the frame portion of the data after a block in the units of the block having the FFT size, and adding it before the block;
   performing initial signal detection, automatic gain control, synchronization, and channel estimation to generate the preamble;
   constructing the frame structure using a preamble interval and a data interval; and
   adding the channel effect to the generated transmission frame.

4. The method as claimed in claim 1, wherein (c) comprises:
   eliminating the CP;
   processing signals received in the unit of blocks, and extracting the preamble; and
   performing an initial channel estimation using the preamble.

5. The method as claimed in claim 1, wherein (d) comprises:
   determining an updating constant adequate for a current channel condition or the amount of the residual frequency offset;
   updating the channel estimation according to the determined updating constant and the average phase of pilots; and
   performing channel compensation using the updated channel estimation.

6. The method as claimed in claim 1, wherein (e) comprises:
   extracting the pilot portion from the data and a pilot output after the channel estimation, and outputting the extracted pilot portion;
   receiving the pilot portion, calculating the average phase of all the pilots in one FFT block, and outputting the average phase of pilots;
   performing the IFFT operation using the data and the pilot portion;
   extracting the data, and outputting the extracted data; and
   determining the digital signal from the extracted data.

7. An apparatus for tracking a residual frequency offset, which is for a single carrier-frequency domain equalizer system, the apparatus comprising: a cyclic prefix remover for removing a cyclic prefix; an FFT section for processing signals received in a unit of FFT blocks, and extracting a preamble; a channel estimator for performing an initial channel estimation using the preamble; an updating constant calculator for calculating an updating constant adequate for a current channel condition or the amount of the residual frequency offset; a channel estimate updater for updating the channel estimation from the channel estimator according to the determined updating constant and an average phase of pilots; the frequency domain channel equalizer for performing channel compensation using the channel estimation received from the channel estimate updater; a pilot extractor for extracting a pilot portion from the data and the pilot output from the frequency domain channel equalizer, and outputting the extracted pilot portion; an average pilot phase calculator for receiving the pilot portion, calculating an average phase of all the pilots in one FFT block, and sending the average phase of pilots to the channel estimate updater: an IFFT section for performing an IFFT operation using the data and the pilot portion from an output of an equalizer: a data extractor for extracting the data and outputting the extracted data; and a signal determiner for determining the digital signal from the extracted data outputted by the data extractor.

8. The apparatus as claimed in claim 7, wherein the channel estimation successively updated by the channel estimate updater is used for channel equalization.

9. The apparatus as claimed in claim 7, wherein the updating constant calculator determines the updating constant based on a signal-to-noise ratio or the amount of the residual frequency offset.

10. An apparatus for tracking a residual frequency offset, which is for a single carrier-frequency domain equalizer system, the apparatus comprising:
   a signal mapper for mapping data to be transmitted according to a modulation method, upon receiving a digital signal;
   a pilot calculator for determining a pilot from the values of the data mapped by the signal mapper and known pilot data to be added;
   a pilot adder for adding the pilot determined by the pilot calculator to the leading part of the data;
   a cyclic prefix adder for copying a part of a frame portion of the data after a first block in a unit of blocks having an FFT size, and adding said part before the first block;
   a preamble generator for performing initial signal detection, automatic gain control, synchronization, and channel estimation;
   a frame composer for constructing one frame structure using a preamble interval and a data interval;
   a multipath fading channel applier for providing a channel effect to the generated transmission frame;
   a cyclic prefix remover for removing a cyclic prefix;
   an FFT section for processing signals received in the units of the FFT block, and extracting the preamble;
   a channel estimator for performing an initial channel estimation using the preamble;
   an updating constant calculator for determining an updating constant adequate for a current channel status or the amount of the residual frequency offset;
   a channel estimate updater for updating the channel estimation from the channel estimator according to the determined updating constant and an average phase of pilots;
   a frequency domain channel equalizer for performing a channel estimation using the channel estimation received from the channel estimate updater;
   a pilot extractor for extracting a pilot portion from the data and a pilot output from the frequency domain channel equalizer, and outputting the extracted pilot portion;
   an average pilot phase calculator for receiving the pilot portion, calculating the average phase of all the pilots in one FTT block, and outputting the average phase of pilots to the channel estimate updater;
   an IFFT section for performing an IFFT operation using the data and the pilot portion;
   a data extractor for extracting the data and outputting the extracted data; and
   a signal determiner for recovering the digital signal from the extracted data outputted by the data extractor.

* * * * *